US008077853B2

(12) United States Patent
Liu et al.

(10) Patent No.: US 8,077,853 B2
(45) Date of Patent: Dec. 13, 2011

(54) VOIP ADAPTER, IP NETWORK DEVICE AND METHOD FOR PERFORMING ADVANCED VOIP FUNCTIONS

(75) Inventors: Xiao Xi Liu, Beijing (CN); Wei Lu, Beijing (CN); Qing Bo Wang, Beijing (CN); Bo Yang, Beijing (CN); Chun Ying, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 11/718,358

(22) PCT Filed: Oct. 12, 2005

(86) PCT No.: PCT/EP2005/055206
§ 371 (c)(1),
(2), (4) Date: Jan. 20, 2009

(87) PCT Pub. No.: WO2006/048369
PCT Pub. Date: May 11, 2006

(65) Prior Publication Data
US 2009/0122785 A1 May 14, 2009

(30) Foreign Application Priority Data
Nov. 1, 2004 (CN) .......................... 2004 1 0087131

(51) Int. Cl.
*H04M 7/00* (2006.01)
(52) U.S. Cl. ................................ 379/221.01; 379/93.01
(58) Field of Classification Search ................. 379/221; 370/352
See application file for complete search history.

(56) References Cited

U.S. PATENT DOCUMENTS

| 6,826,174 B1 * | 11/2004 | Erekson et al. | 370/352 |
| 2001/0046237 A1 | 11/2001 | Chan | |
| 2002/0101965 A1 * | 8/2002 | Elzur | 379/93.01 |
| 2002/0164003 A1 | 11/2002 | Chang | |
| 2003/0072421 A1 * | 4/2003 | Hosomi | 379/67.1 |
| 2003/0235183 A1 * | 12/2003 | Skelton et al. | 370/352 |

FOREIGN PATENT DOCUMENTS
DE 102004028146 11/2004

OTHER PUBLICATIONS

"Installation, Configuration and Operation of Fritz! Box Fon WLAN", AVM GmbH, May 2005, pp. 1-20 and 37-66.

* cited by examiner

*Primary Examiner* — Curtis Kuntz
*Assistant Examiner* — Amal Zenati
(74) *Attorney, Agent, or Firm* — William Stock; Anne Vachon Dougherty

(57) ABSTRACT

A VoIP adapter for POTS a phone comprises: a POTS phone connector, an IP network interface, two sets of signaling senders, signaling receivers, media senders and media receivers for the POTS phone and the IP network respectively, and a controller for controlling the operations of above components. The VoIP adapter enables the user to carry out VoIP communications using a normal POTS phone and further enables use of advanced VoIP functions via the normal POTS phone, such as Call Hold, Call Transfer, Ad Hoc Conference, etc.

9 Claims, 5 Drawing Sheets

US 8,077,853 B2

VOIP ADAPTER, IP NETWORK DEVICE AND METHOD FOR PERFORMING ADVANCED VOIP FUNCTIONS

TECHNICAL FIELD OF THE INVENTION

The present invention relates to the field of telecommunications, and more specifically, to a VoIP adapter for a POTS phone.

BACKGROUND OF THE INVENTION

VoIP (Voice over Internet Protocol) service is getting more and more popular due to the low price and the possibility of providing various value-added services. Now IP technology can be used not only in the backbone of telecommunication networks, but also in the "last mile" to the end user. Although there are lots of VoIP-related products available in the market, such as hardware VoIP phones and VoIP client software, these products are only available to PC terminals.

However, it would be very convenient for end users if they can directly use a normal POTS phone to access the VoIP service. Such a demand has led to the emergence of the Phone Adapter products which enable a POTS phone to make IP phone calls. A Phone Adapter is equivalent to a mini signaling and media gateway, and can perform bi-directional signaling and media stream transformation. So a POTS phone plus a Phone Adapter can be regarded as an IP phone with the same function (semantically) of the POTS phone. Using such a solution, the POTS phone which is already used by the end user for access to a public switch telephone network (PSTN) can be reused, and the end user is more familiar with a POTS phone than a VoIP phone or VoIP client software. Moreover, if there are both POTS and VoIP services available, the user could use only a POTS phone to access the both services.

Since the function set of the POTS phone service is a subset of that of the VoIP service, the POTS user cannot use many advanced functions provided by the VoIP service, such as Call Transfer. The Call Transfer function is normally provided by a PBX in a PSTN, while for the VoIP service, it is only a client side function. Although the VoIP service comprises all the PSTN services, since the POTS phone does not support the advanced VoIP functions, the user is not able to use these functions via a POTS phone.

SUMMARY OF THE INVENTION

In order to solve the above mentioned problems in prior art, the present invention proposes a VoIP adapter for POTS phone, thereby enabling a user to carry out VoIP communications by using a normal POTS phone and further to use the advanced VoIP functions via a normal POTS phone.

According to one aspect of the present invention, there is provided a VoIP adapter for POTS phone, comprising: a POTS phone connector for connecting to a POTS phone; an IP network interface for connecting to a IP network; a first signaling receiver for receiving signaling messages from the POTS phone; a second signaling receiver for receiving signaling messages from the IP network; a first signaling sender for sending signaling messages to the POTS phone; a second signaling sender for sending signaling messages to the IP network; a first media receiver for receiving media data from the POTS phone; a second media receiver for receiving media data from the IP network; a first media sender for sending media data in a format that can be recognized by the POTS phone to the POTS phone; a second media sender for sending the media data in the form of VoIP packets to the IP network; and a controller for controlling said first and said second signaling sender to send out signaling messages, said first and said second media receiver to receive incoming media streams, and said first and said second media sender to send out media data.

Preferably, said VoIP adapter for POTS phone further comprises: a DTMF (Dual Tone Multiple Frequency) signal detector for detecting DTMF signals in all the signals received from the POTS phone and decoding them; and a command store for storing a set of digit sequence commands which represent the advanced VoIP functions; wherein, said controller compares the digit sequences decoded from the DTMF signals with said set of digit sequence commands, and performs the corresponding advanced VoIP functions.

According to another aspect of the present invention, there is provided an IP network device, which comprises the above described VoIP adapter for POTS phone.

According to another aspect of the present invention, there is provided a method for performing advanced VoIP functions via a POTS phone, comprising: using a POTS phone to send a digit sequence command in the form of DTMF signals; detecting and decoding said DTMF signals into a DTMF digit sequence; comparing said DTMF digit sequence with the predefined digit sequence commands in a set of digit sequence commands which represent the advanced VoIP functions; and if said DTMF digit sequence is one digit sequence command representing an advanced VoIP function, performing the advanced VoIP function.

The present invention enables a user to carry out VoIP communications by using a normal POTS phone and further to use the advanced VoIP functions via a normal POTS phone, such as Call Hold, Call Transfer, Ad Hoc conference, etc.

BRIEF DESCRIPTION OF THE DRAWINGS

Embodiments of the invention will now be described by way of example only and with reference to the accompanying drawings in which.

DETAILED DESCRIPTION OF THE PREFERRED EMBODIMENTS

Figure 1:
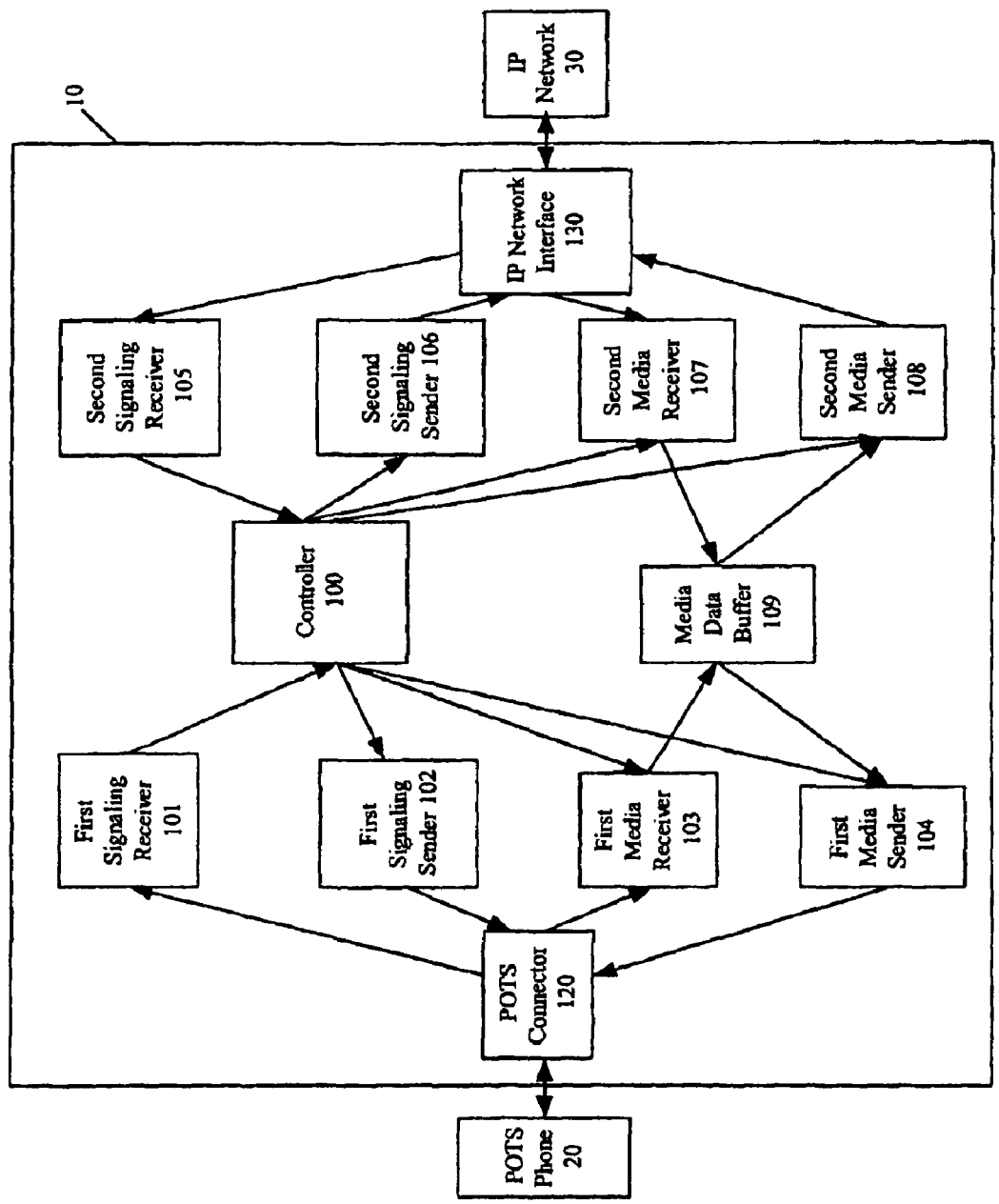
FIG. 1 is a schematic diagram of a VoIP adapter for POTS phone according to one embodiment of the present invention.

FIG. 1 is a schematic diagram of a VoIP adapter 10 for POTS phone according to one embodiment of the present invention. As shown in FIG. 1, the VoIP adapter 10, which is used to allow a POTS phone 20 to access to a IP network 30 to carry out VoIP communications, comprises: a POTS phone connector 120 (hereinafter referred to as a POST connector) which connects the VoIP adapter 10 to the POTS phone 20, such as a RJ11 port; an IP network interface 130 for connecting the VoIP adapter 10 to the IP network 30.

The VoIP adapter 10 of FIG. 1 further comprises: a first signaling receiver 101 which receives the signaling messages related to call connection from the POTS phone 20, for example Initial Address Message (IAM), and then processes the received signaling messages into an event to drive a controller 100 which is described below; a first signaling sender 102 which sends the signaling messages related to call connection to the POTS phone 20 according to the instructions of the controller 100, such as the connection message CONNECTION; a first media receiver 103 which receives the media data from the POTS phone 20 according to the instructions of the controller 100 after the voice channel has been set up and decodes the received media data, then buffers the decoded media data; a first media sender 104 which reads the decoded media data from a second media receiver 107 described below according to the instructions of the controller 100, and encodes and transform them into a format that can be recognized by the POTS phone 20, and then sends them to the POTS phone 20.

Further, the VoIP adapter 10 of FIG. 1 further comprises: a second signaling receiver 105 for receiving the VoIP signaling messages related to call connection from the IP network 30, and then processing the received signaling messages into an event to drive the controller 100; a second signaling sender 106 for sending the VoIP signaling messages related to call connection to the IP network 30 according to the instructions of the controller 100; a second media receiver 107 for receiving the voice (media) data from the IP network 30 according to the instructions of the controller 100 after the voice channel has been set up and decoding the received media data, then storing the decoded media data; a second media sender 108 for obtaining the decoded media data from said first media receiver 103 according to the instructions of the controller 100 and encoding them into the form of VoIP data packets and then sending them to the IP network 30; a controller 100 which is the central component of the VoIP adapter 10, and controls the operations of the VoIP adapter 10 and coordinates the operations of other components of the VoIP adapter 10, mainly controlling the first signaling sender 102 and the second signaling sender 106 to send out signaling messages, controlling the first media receiver 103 and the second media receiver 107 to receive media data, and controlling the first media sender 104 and the second media sender 108 to send out media data.

The working process of the VoIP adapter 10 according to this embodiment will be described as follows: the first signaling receiver 101 receives the signaling messages related to call connection from the PTOS phone 20 and then processes them into an event to drive the controller 100; then the controller 100 instructs the second signaling sender 106 to send the corresponding VoIP signaling messages related to call connection to the IP network 30. The VoIP signaling messages (for example, Call Acknowledgement) from the IP network 30 are sent to the second signaling receiver 105 and processed into an event to drive the controller 100; the controller 100 instructs the first signaling sender 102 to send the corresponding signaling messages related to call connection to the POTS phone 20. When the voice channel has been set up, the controller 100 instructs the first media receiver 103 and the second media receiver 107 to receive the media data from the POTS phone 20 and the IP network 30 respectively, then in the first media receiver 103 and the second media receiver 107 the received media data are decoded into the media data in an inner data format, for example, the raw data format, and the decoded media data are buffered. Then the controller 100 instructs the first media sender 104 to obtain the media data to be sent from the second media receiver 107, encode and transform them into the media data in a format that can be recognized by the POTS phone 20, and send them to the POTS phone 20. The controller 100 instructs the second media sender 108 to obtain the media data to be sent from the first media receiver 103, encode them into VoIP data packets and send the packets to the IP network 30.

Preferably, in this embodiment, the controller 100 can be implemented by a state machine which would be driven by external events. The external events include receiving the signaling messages from the PTOS phone 20 and receiving the signaling messages from the IP network 30.

In addition, when the controller 100 is realized in the form of software, it can be designed to have multiple processes, each of which is responsible for one communication session.

From the above description it can be seen that the VoIP adapter 10 of this embodiment can allow a user to carry out the VoIP communications by using a normal PTOS phone.

Furthermore, the VoIP adapter 10 of the embodiment shown in FIG. 1 may further comprise a media data buffer 109 for buffering the media data in an inner data format. The media data from the POTS phone 20 and the IP network 30 are decoded into the media data in an inner data format in the first media receiver 103 and the second media data receiver 107, and then stored in the media data buffer 109. According to the instructions of the controller 100, the first media sender 104 and the second media sender 108 read the media data to be sent from the media data buffer 109 and transform them into the media data in a corresponding format to send.

Preferably, the VoIP adapter 10 may comprise multiple media data buffers 109, each of which buffers the media data of one voice channel.

Figure 2:
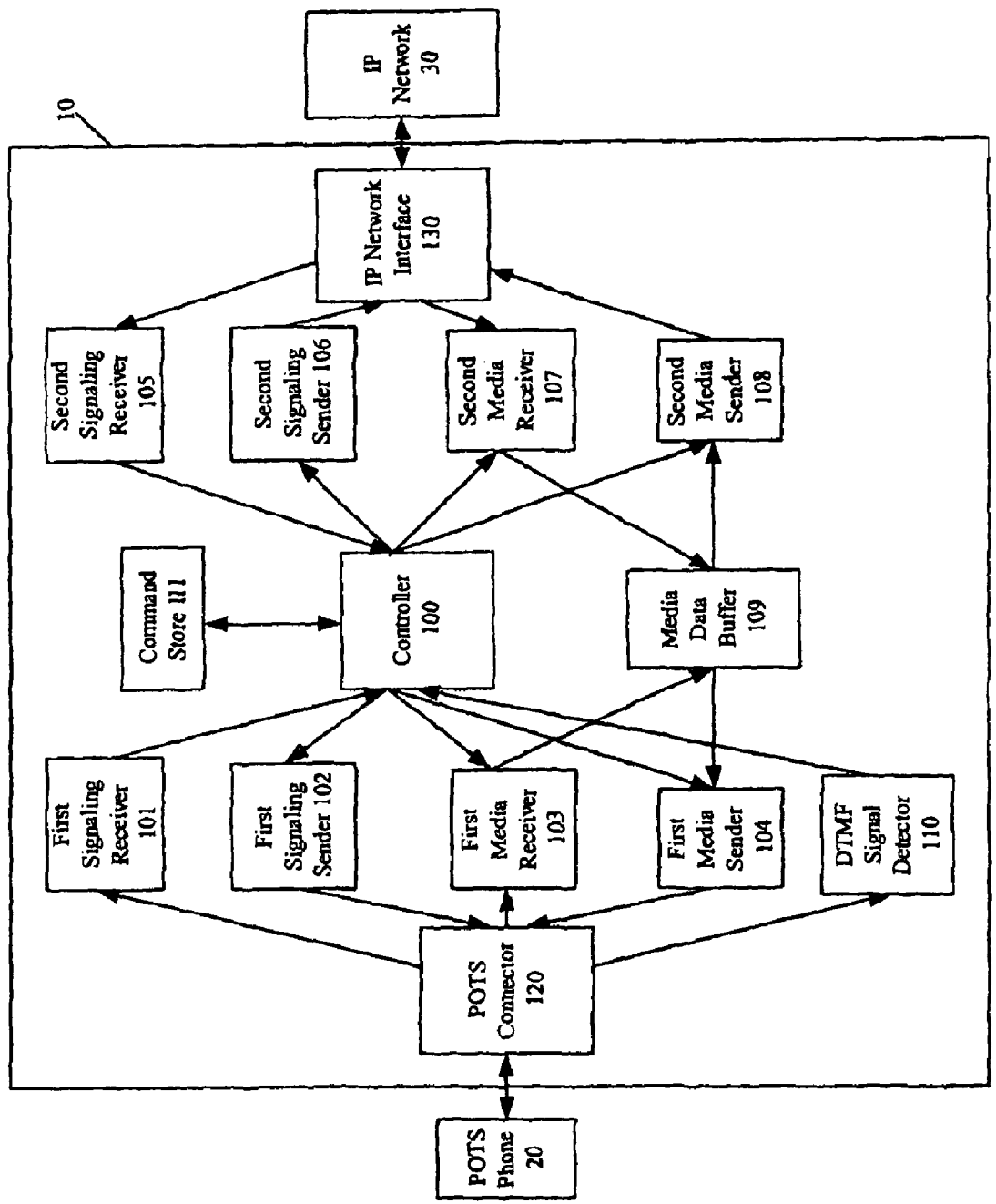
FIG. 2 is a schematic diagram of a VoIP adapter for POTS phone according to another embodiment of the present invention.

FIG. 2 is a schematic diagram of a VoIP adapter 10 for POTS phone according to another embodiment of the present invention, in which the same components as those in the embodiment of FIG. 1 bear the same marks and the corresponding descriptions are properly omitted.

Compared with the embodiment of FIG. 1, the VoIP adapter 10 of the present embodiment is added with a Dual Tone Multiple Frequency (DTMF) signal detector 110 and a command store 111. The DTMF signal detector 110 is used to detect whether there are DTMF signals in all the signals received from the POTS phone 20; if there are, the detected DTMF signals are decoded and processed into the corresponding DTMF events to drive the controller 100. The command store 111 which is connected to the controller 100 stores the set of the predefined digit sequence commands representing the advanced VoIP functions, in which each digit sequence command corresponds to an advanced function, for example, "#01#" for Call Transfer, "#02#" for Call Hold, etc. Any digit sequence that is unique and does not interfere with the common call functions can be used as a valid digit sequence here. In this embodiment, besides executing the functions in the embodiment of FIG. 1, the controller 100 also compares the digit sequence of the decoded DTMF signals with the digit sequence commands stored in the command store 111, and when the digit sequence of the DTMF signals received from the POTS phone is one of the predefined digit sequence commands for the advanced VoIP functions, performs the corresponding VoIP function.

In this embodiment, besides the two external events in the embodiment of FIG. 1, the DTMF events generated by the DTMF signal detector 110, which belong to internal events, are also included.

After detecting the DTMF signals, the DTMF signal detector 110 decodes them into a DTMF digit sequence, and uses the DTMF digit sequence as a DTMF event to drive the controller 100. When the controller 100 has been driven, the controller 100 compares the received DTMF digit sequence with the set of digit sequence commands stored in the command store 111. If the DTMF digit sequence is one of the digit sequence commands in the set, it indicates that the POTS phone 20 requests to use the advanced VoIP function corresponding to this digit sequence command. Then the controller 100 performs the function. If the DTMF digit sequence is not a predefined digit sequence command, the controller 100 encodes it into the appropriate VoIP data packets and sends the VoIP data packets to the IP network 30 via the second media sender 108.

From the above description it can be seen that the VoIP adapter 10 of the above embodiment can not only allow a user to carry out VoIP communications via a POTS phone, but also allow the user to perform the advanced VoIP functions via the POTS phone, such as Call Hold, Call Transfer, Ad Hoc Conference etc.

Figure 3:
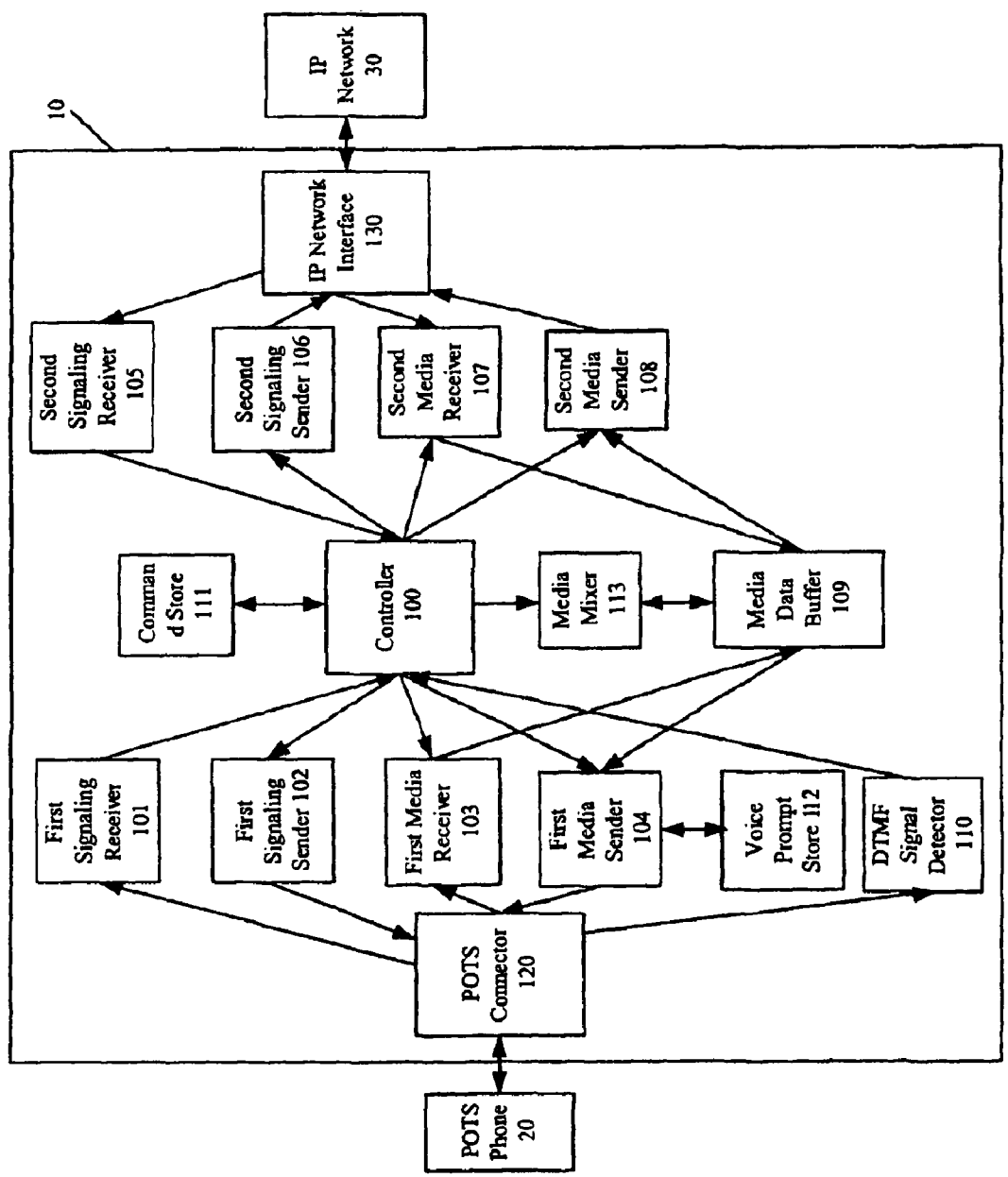
FIG. 3 is a schematic diagram of a VoIP adapter for POTS phone according to yet another embodiment of the present invention.

FIG. 3 is a schematic diagram of a VoIP adapter for POTS phone according to yet another embodiment of the present invention, in which the same components as those in the embodiment of FIG. 2 bear the same marks and the corresponding descriptions are properly omitted.

Compared with the embodiment of FIG. 2, a voice prompt store 112 and a media mixer 113 are added to this embodiment. The voice prompt store 112 which is coupled to the first media sender 104 stores pre-recorded voice prompt sentences. When needed, according to the instructions of the controller 100, the first media sender 104 can play the voice prompt sentences to the user, for example, when the called user is busy, the controller 100 can instruct the first media sender 104 to play the prompt "The subscriber you dialed is busy now, please redial later" to the calling user; for another example, when the user sets the advanced VoIP functions, the controller 100 can instruct the first media sender 104 to play the appropriate voice prompt sentences to the user to prompt the user to the next operation or whether the present operation is ended successfully. The media mixer 113 is connected to the controller 100 and the media data buffer 109 respectively and mixes the specified media data streams according to the instructions of the controller 100. For example, during an Ad Hoc Conference, according to the instructions of the controller 100, the media mixer 113 can find the specified media data streams in the media data buffer 109 and mix them, and then store them in the media data buffer 109, which are sent to the POTS phone 20 via the first media sender 104.

From the above description it can be seen that the VoIP adapter 10 of this embodiment can play voice prompts to the user to facilitate the user's operations in some special cases when for example the called user is busy, the call cannot be connected or the user is setting the advanced VoIP functions. Furthermore, it can mix the media data when performing some special functions such as Ad Hoc Conference.

According to another aspect of the present invention, a new IP network device is provided, which comprises the VoIP adapter for POTS phone as described above. In such a IP network device, the VoIP adapter is a component and combined with a prior art IP network device. Such a IP network device may be for example a modem, an access server, a proxy server, a router or an Ethernet switch.

Figure 4:
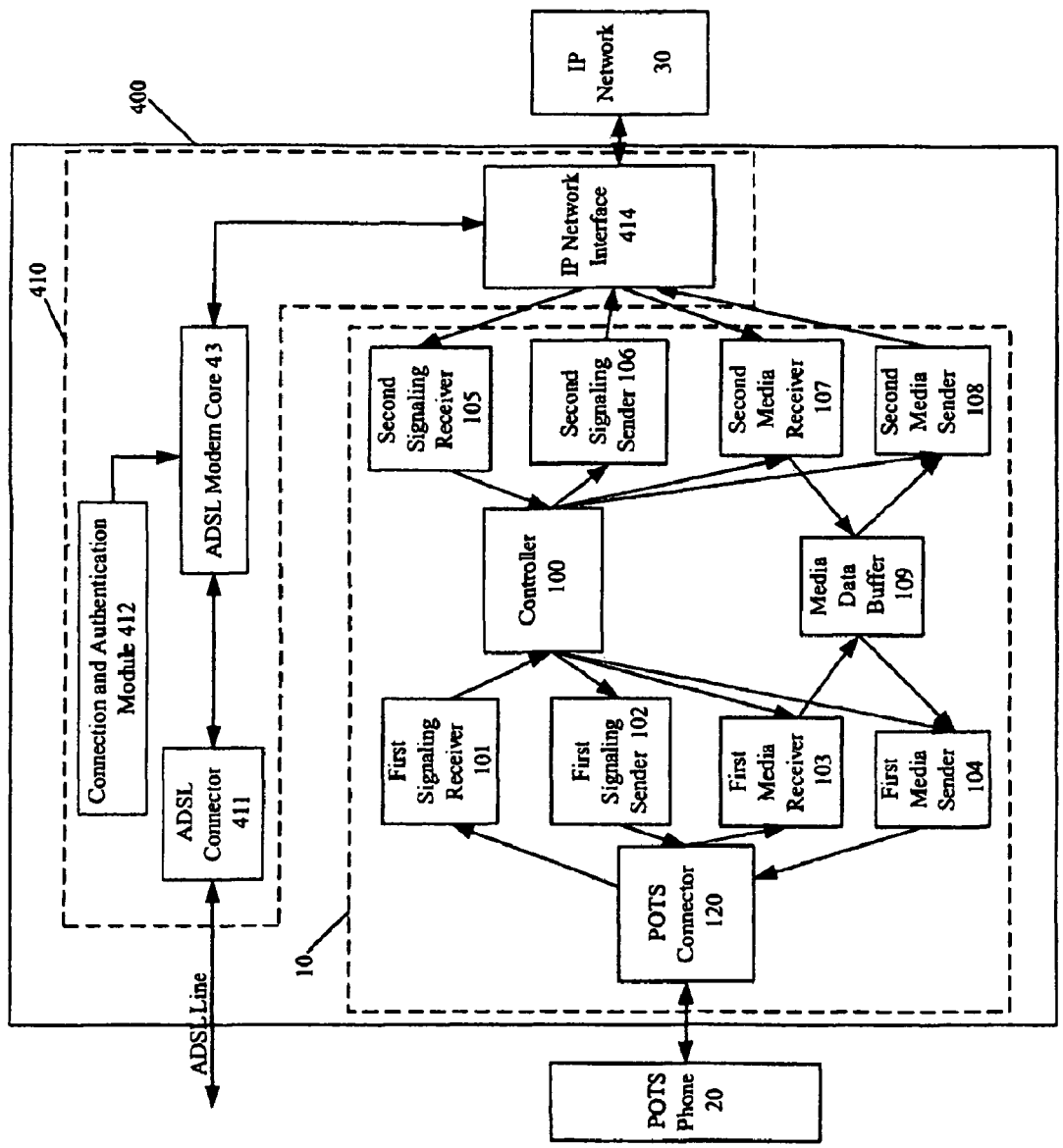
FIG. 4 is a schematic diagram of an ADSL modem according to one embodiment of the present invention.

FIG. 4 is a schematic diagram of an ADSL modem 400 according to one embodiment of the present invention. The ADSL modem 400 is composed of a traditional ADSL modem 410 and the VoIP adapter 10. The traditional ADSL modem 410 may comprise an ADSL connector 411, a connection and authentication module 412, an ADSL modem core 413 and an IP network interface 414 etc. It can connect an ADSL network with an IP network, that is, it can enable the IP packets to be transmitted through ADSL lines, which is known to those skilled in the art. The ADSL modem 400 of this embodiment, on the basis of the traditional ADSL modem 410, also includes the VoIP adapter 10 for POTS phone which may share the IP network interface 414 of the traditional ADSL modem 410, as shown in FIG. 4. Thus, the ADSL modem 400 of this embodiment can not only perform the functions of the traditional ADSL modem, but also provide the function of making an IP call via a POTS phone. Further, the ADSL modem 400 can also provide the advanced VoIP functions to the POTS phone when the VoIP adapter 10, as part of the ADSL modem 400, is the VoIP adapter of FIG. 2 or 3.

Similarly, apart from an ADSL modem, other IP network devices like for example a router, a switch and a modem etc. supporting the TCP/IP protocols can be combined with the VoIP adapter for POTS phone according to the present invention, and form a new IP network device. Such an IP network device can not only perform the functions of a prior art IP network device, but also have the new functions brought by the VoIP adapter.

The VoIP adapter for POTS phone and the various components of the IP network device as described above may be implemented in the form of software or hardware, and may be physically separated from and operationally interconnected to each other, or some components may be combined together.

Figure 5:
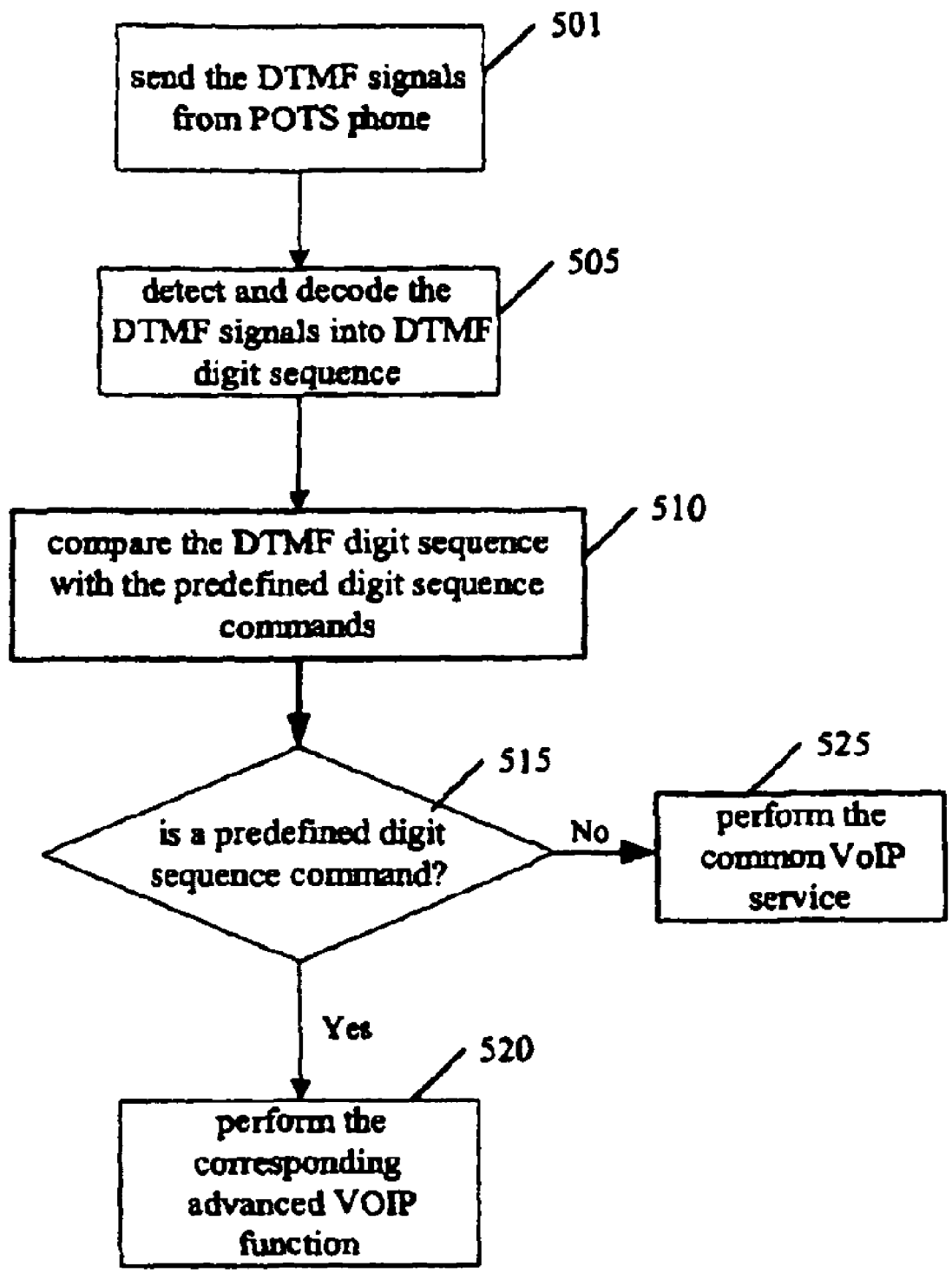
FIG. 5 is a flowchart of a method for performing advanced VoIP functions via a POTS phone according to one embodiment of the present invention.

FIG. 5 is a flowchart of a method for performing advanced VoIP functions via a POTS phone according to one embodiment of the present invention. As shown in FIG. 5, at Step 501, a digit sequence command is sent by way of DTMF signals via the POTS phone; at Step 505, the DTMF signals are detected and decoded into the DTMF digit sequence; next at Step 510, the DTMF digit sequence is compared with each digit sequence command in the predefined set of digit sequence commands representing the advanced VoIP functions, and at Step 515, it is determined whether the decoded DTMF digit sequence is a digit sequence command representing an advanced VoIP function; if it is, at Step 520, the advanced VoIP function corresponding to the digit sequence command is performed; otherwise, at Step 525, the normal VoIP service is processed.

In this embodiment, the advanced VoIP functions are represented by digit sequence commands, for example, "#01#" for Call Transfer, "#02#" for Call Hold, etc. Then the set of these digit sequences is stored in the command store 111. During the call, if the user wants to use an advanced VoIP function, he can input the digit sequence command corresponding to the function using the keyboard of the POTS phone. The inputted digit sequence will be encoded by the POTS phone into the DTMF signals to send. If the DTMF signal detector 110 detects that there are DTMF signals in the received signals from the POTS phone 20, it will decodes the DTMF signals into the DTMF digit sequence. Then the controller 100 compares the DTMF digit sequence with each digit sequence command in the set of the digit sequence commands stored in the command store 111; if the DTMF digit sequence is a certain digit sequence in the set, the controller 100 performs the advanced VoIP function corresponding to the digit sequence command; if the DTMF digit sequence is not any digit sequence in the set, the DTMF digit sequence will be encoded into appropriate VoIP data packets to be sent to the IP network 30 via the second media sender 108.

During the execution of the advanced VoIP functions, the controller 100 may also instruct the first media sender 104 to play voice prompts to the user to prompt the user to the next operation or whether the present operation is ended successfully etc. For example, during the process of the Call Transfer, the first media sender 104 would play the voice prompt "Please input the phone number of the transferred user".

From the above description it can be seen that the present method can enable the user to use the advanced VoIP functions via the POTS phone and facilitate the user's operation by means of playing voice prompts.

Although a VoIP adapter for POTS phone, an IP network device and a method for realizing advanced VoIP functions using a POTS phone of the present invention have been described in detail through some exemplary embodiments, these embodiments are not exhaustive, and those skilled in the art can make various variations and modifications thereof within the scope of the present invention. Therefore, the present invention is not limited to these embodiments, and the scope of the present invention is only defined by the appended claims.

The invention claimed is:

1. A Voice over IP (VoIP) adapter for POTS phone, comprising:
    a POTS phone connector for connecting to a POTS phone;
    an IP network interface for connecting to an IP network;
    a first signaling receiver for receiving signaling messages from a POTS phone;
    a second signaling receiver for receiving signaling messages from the IP network;
    a first signaling sender for sending signaling messages to the POTS phone;
    a second signaling sender for sending signaling messages to the IP network;
    a first media receiver for receiving media data from the POTS phone;
    a second media receiver for receiving media data from the IP network;
    a first media sender for sending media data in a format that can be recognized by the POTS phone to the POTS phone;
    a second media sender for sending media data in the form of appropriate VoIP data packets to the IP network;
    a controller for controlling said first and said second signaling sender to send out signaling messages, said first and said second media receiver to receive incoming media streams, and said first and said second media sender to send out media data;
    a DTMF (Dual Tone Multiple Frequency) signal detector for detecting DTMF signals in all the signals received from the POTS phone and decoding them; and
    a command store for storing a set of digit sequence commands which represent the advanced VoIP functions;
    wherein, said controller compares the digit sequence decoded from the DTMF signals with said set of digit sequence commands, and performs the corresponding advanced VoIP function.

2. The VoIP adapter according to claim 1, further comprising:
    a media mixer for mixing specified media data streams according to the instructions of said controller.

3. The VoIP adapter according to claim 1, further comprising:
    a media data buffer for storing media data.

4. The VoIP adapter according to claim 3, comprising a plurality of media data buffers, each of which stores the media data of one voice channel.

5. The VoIP adapter according to claim 3, characterized in that said controller is implemented by a state machine, which is driven by the events generated by said first signaling receiver, said second signaling receiver or said DTMF signal detector.

6. The VoIP adapter according to claim 5, further comprising:
    a voice prompt store for storing pre-recorded voice prompts.

7. A VoIP network device comprising:
    a VoIP adapter comprising:
    a POTS phone connector for connecting to a POTS phone;
    an IP network interface for connecting to an IP network;
    a first signaling receiver for receiving signaling messages from a POTS phone;
    a second signaling receiver for receiving signaling messages from the IP network;
    a first signaling sender for sending signaling messages to the POTS phone;
    a second signaling sender for sending signaling messages to the IP network;
    a first media receiver for receiving media data from the POTS phone;
    a second media receiver for receiving media data from the IP network;
    a first media sender for sending media data in a format that can be recognized by the POTS phone to the POTS phone;
    a second media sender for sending media data in the form of appropriate VoIP data packets to the IP network;
    a controller for controlling said first and said second signaling sender to send out signaling messages, said first and said second media receiver to receive incoming media streams, and said first and said second media sender to send out media data, and wherein said adapter shares the IP network interface with at least one of:
    a modem, an access server, a proxy server, a router and an Ethernet switch; and
    a DTMF (Dual Tone Multiple Frequency) signal detector for detecting DTMF signals in all the signals received from the POTS phone and decoding them; and
    a command store for storing a set of digit sequence commands which represent the advanced VoIP functions;
    wherein, said controller compares the digit sequence decoded from the DTMF signals with said set of digit sequence commands, and performs the corresponding advanced VoIP function.

8. A method for a VoIP adapter to perform advanced VoIP functions by a POTS phone, comprising the steps of: using a POTS phone to send a digit sequence command in the form of DTMF signals; detecting and decoding said DTMF signals into the DTMF digit sequence; comparing said DTMF digit sequence with predefined digit sequence commands in a set of digit sequence commands which are stored in a command store and which represent advanced VoIP functions; and if said DTMF digit sequence is a digit sequence command of an advanced VoIP function, performing the advanced VoIP function.

9. The method according to claim 8, comprising the further step of:
    sending voice prompts to said POTS phone.

* * * * *